United States Patent [19] [11] 4,037,395
Henkensiefken et al. [45] July 26, 1977

[54] TRACTOR PULLED CROP HARVESTER

[75] Inventors: Larry L. Henkensiefken, Waseca; Glenn G. Kanengieter, Blooming Prairie; T. Herbert Morrell; Thomas N. Storm, both of Owatonna, all of Minn.

[73] Assignee: Owatonna Manufacturing Company, Inc., Owatonna, Minn.

[21] Appl. No.: 669,865

[22] Filed: Mar. 24, 1976

[51] Int. Cl.² .............................................. A01D 75/14
[52] U.S. Cl. ....................................... 56/218; 56/228; 280/463
[58] Field of Search ................ 56/1, DIG. 1, 218, 228, 56/14.4; 280/463, 468

[56] References Cited

U.S. PATENT DOCUMENTS

| 2,095,417 | 10/1937 | Messersmith et al. | 56/228 |
| 3,832,837 | 9/1974 | Burkhart et al. | 56/228 |
| 3,893,283 | 7/1975 | Dandl | 56/228 |
| 3,919,831 | 11/1975 | Halls et al. | 56/228 |

Primary Examiner—J.N. Eskovitz
Attorney, Agent, or Firm—Merchant, Gould, Smith, Edell, Welter & Schmidt

[57] ABSTRACT

A crop harvester having a mobile frame to be pulled by a tractor and movable between paths of travel at opposite sides of the path of travel of the tractor. The frame includes front and rear longitudinal frame members extending transversely of the direction of travel and a generally central transverse frame member connected to the longitudinal frame members above harvesting mechanism mounted in the frame. A draft tongue has a rear end pivotally connected to the frame on a vertical axis adjacent the connection between the front and transverse frame members, and a front end for pivotal connection to a tractor hitch. A fluid pressure operated device is connected to the frame and to the draft tongue for imparting swinging movements to the draft tongue relative to the mobile frame and for holding the draft tongue in desired set positions of the swinging movement thereof.

5 Claims, 11 Drawing Figures

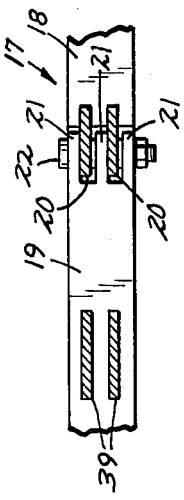
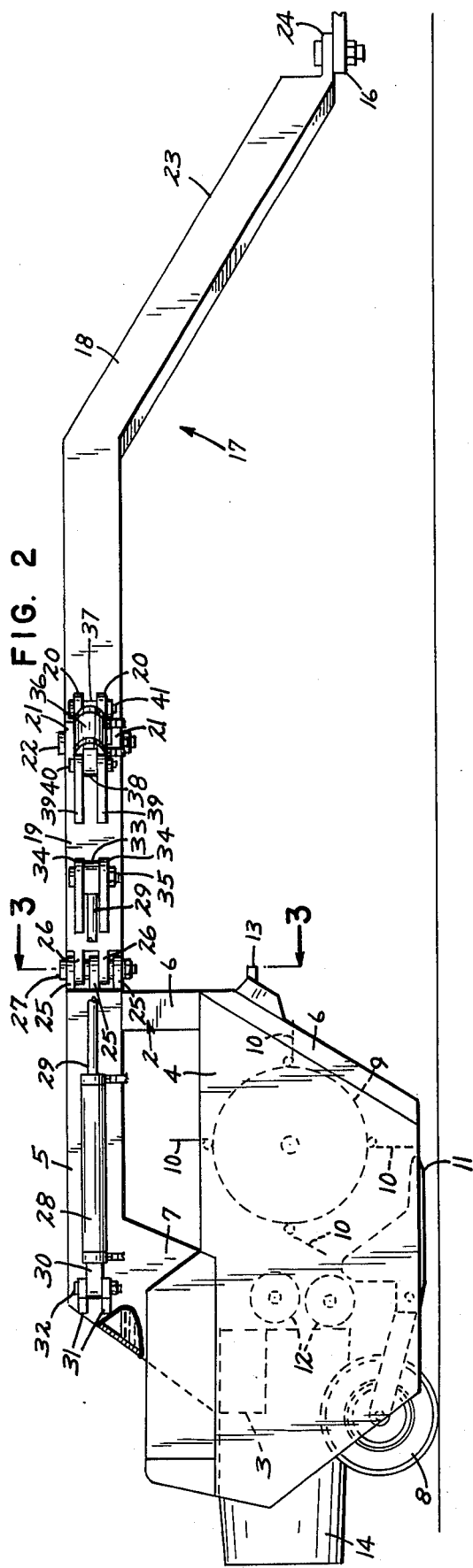
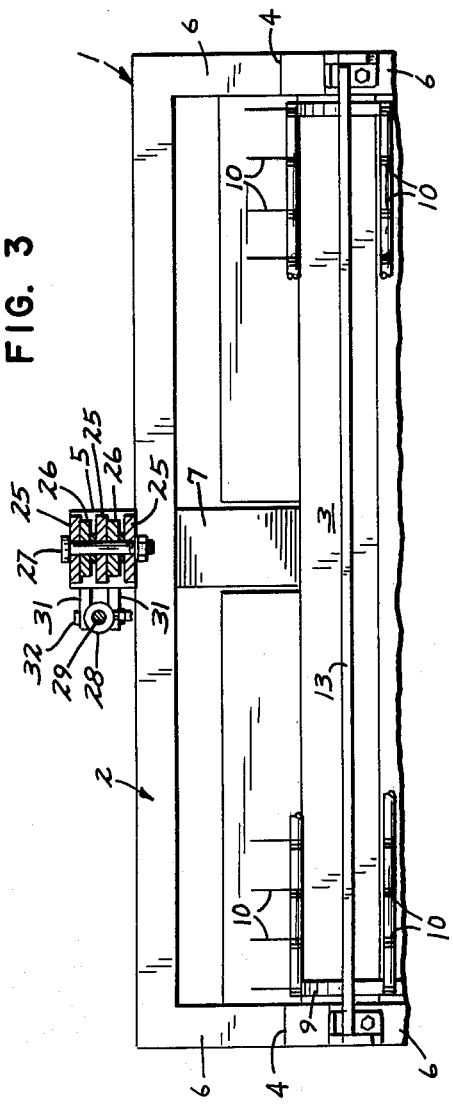

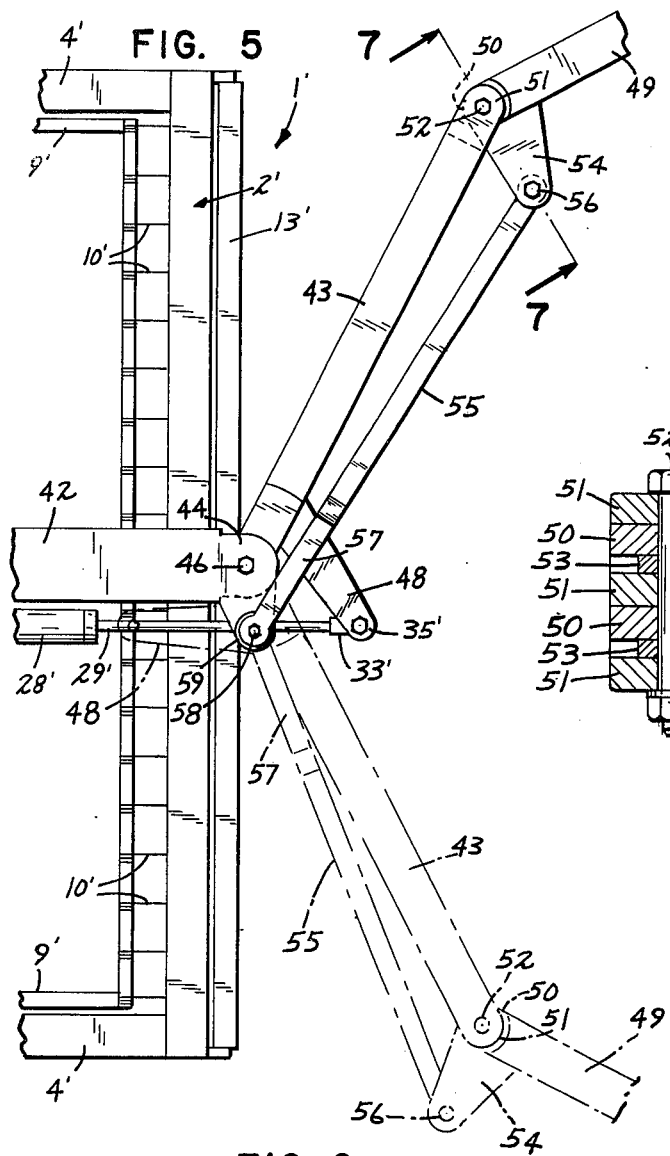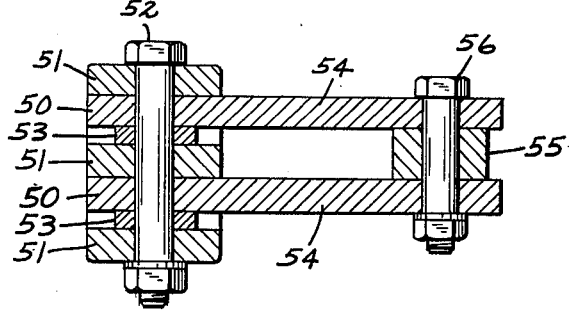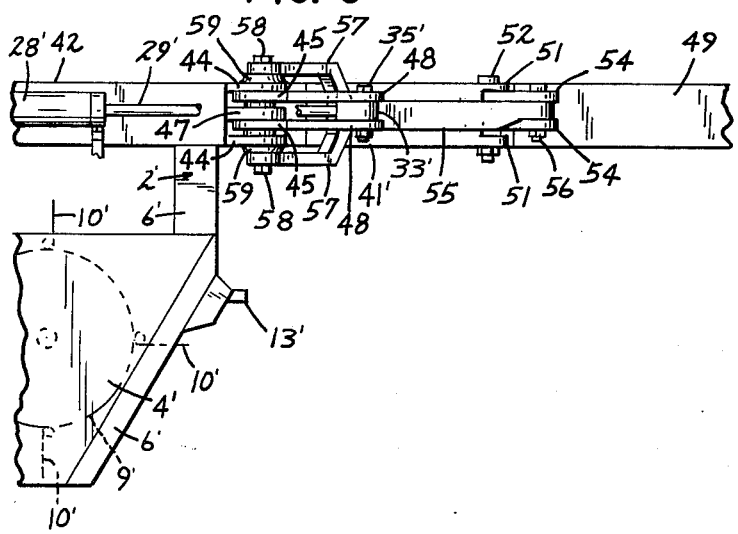

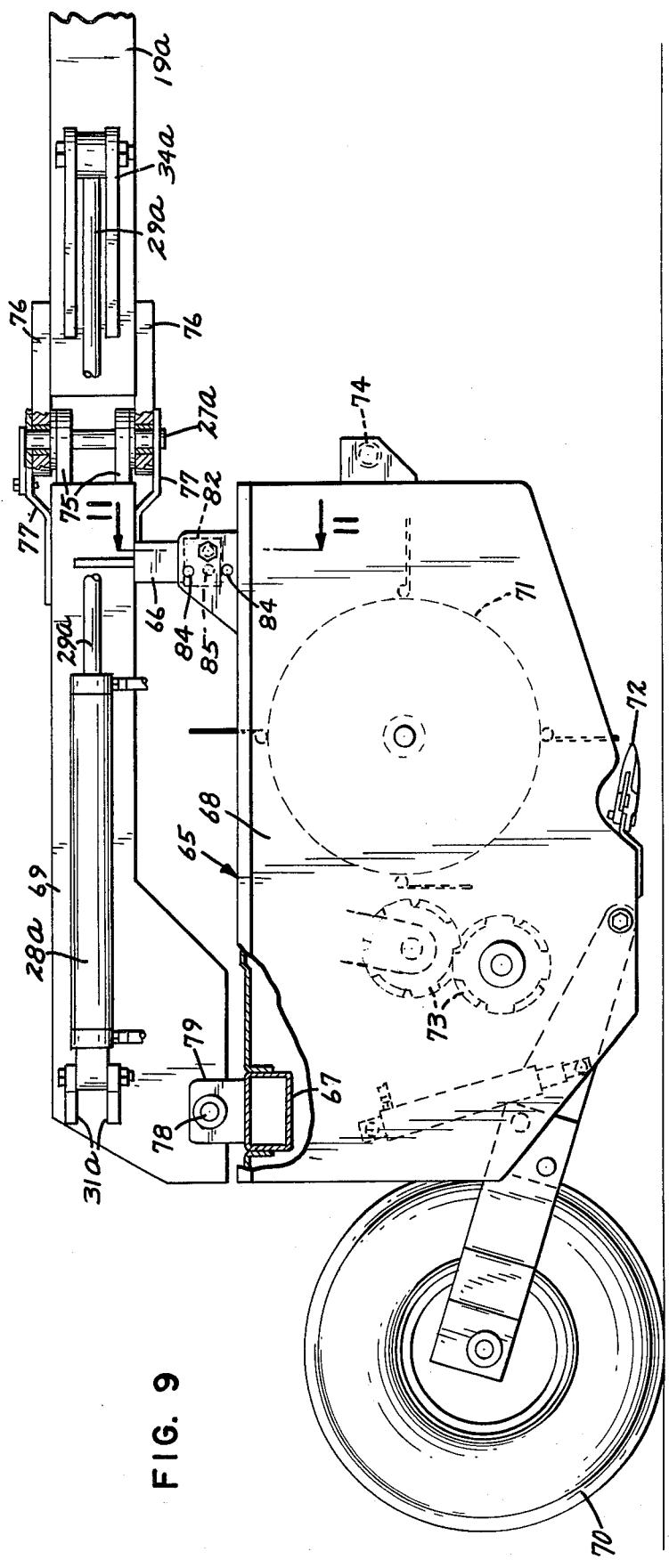
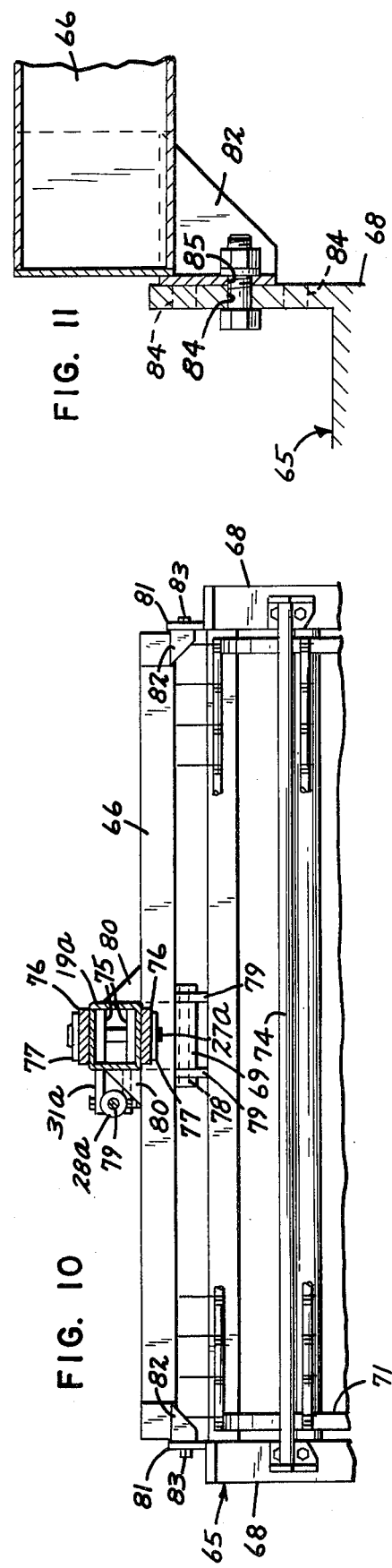

TRACTOR PULLED CROP HARVESTER

BACKGROUND OF THE INVENTION

This invention relates generally to crop harvesters known as swathers, and more particularly to swathers of the type that are adapted to be releasably connected to and to be pulled by a tractor. In order to achieve more flexibility of operation in the field than has been obtained in the past with tractor drawn swathers, means have been provided for moving a crop harvester from one side to the other on the path of travel of the tractor. Some of these involve elongated hitch bars or draft tongues which have portions which arch over the harvester mechanism and are pivotally connected to the harvester frame behind the harvesting mechanism. These hitch bars are quite long and project upwardly a substantial distance above the crop harvesters.

SUMMARY OF THE INVENTION

The pull-type harvester of this invention involves a wheel supported frame which includes front and rear longitudinal frame members that extend transversely of the direction of travel of the frame, and a generally central transverse frame member connecting said front and rear frame members. Harvesting mechanism is mounted in the frame below said transverse frame member. A draft tongue has front and rear ends, and pivot means is provided connecting said rear end to the frame adjacent the connection between the front end of the transverse frame member and the front longitudinal frame member for swinging movements of the draft tongue relative to the frame on a generally vertical axis. Means is provided on the front end of the draft tongue for pivotal connection on a generally vertical axis to a tractor hitch. Power operated means on the frame and draft tongue is operative to impart swinging movements to the draft tongue and for holding the draft tongue in desired positions of swinging movement thereof relative to the frame.

In one embodiment, the draft tongue comprises front and rear tongue sections each having front and rear ends, and is provided with means pivotally securing the front end of the rear section to the rear end of the front section on an axis parallel to the axis of swinging movement of the tongue relative to the frame; and means is provided for imparting pivotal movement to one of the sections relative to the other thereof and for holding the sections in different positions of swinging movement relative to each other.

BRIEF DESCRIPTION OF THE DRAWINGS

FIG. 2 is an enlarged view in side elevation of the harvester of FIG. 1, some parts being broken away and some parts being shown in section;

FIG. 3 is a fragmentary view partly in front elevation and partly in section, taken on the line 3—3 of FIG. 2;

FIG. 4 is an enlarged fragmentary detail in section taken on the line 4—4 of FIG. 1;

FIG. 5 is an enlarged fragmentary view corresponding to a portion of FIG. 1 but showing a modified arrangement;

FIG. 6 is a fragmentary view in side elevation of the crop harvester of FIG. 5;

FIG. 7 is an enlarged detail in section, taken on the line 7—7 of FIG. 5;

FIG. 9 is an enlarged view corresponding to a portion of FIG. 2, but showing another modified arrangement;

FIG. 10 is a view corresponding to FIG. 3 and showing the modified arrangement of FIG. 9; and FIG. 11 is an enlarged fragmentary section taken on the line 11—11 of FIG. 9.

DETAILED DESCRIPTION OF THE PREFERRED EMBODIMENTS

Figure 1:
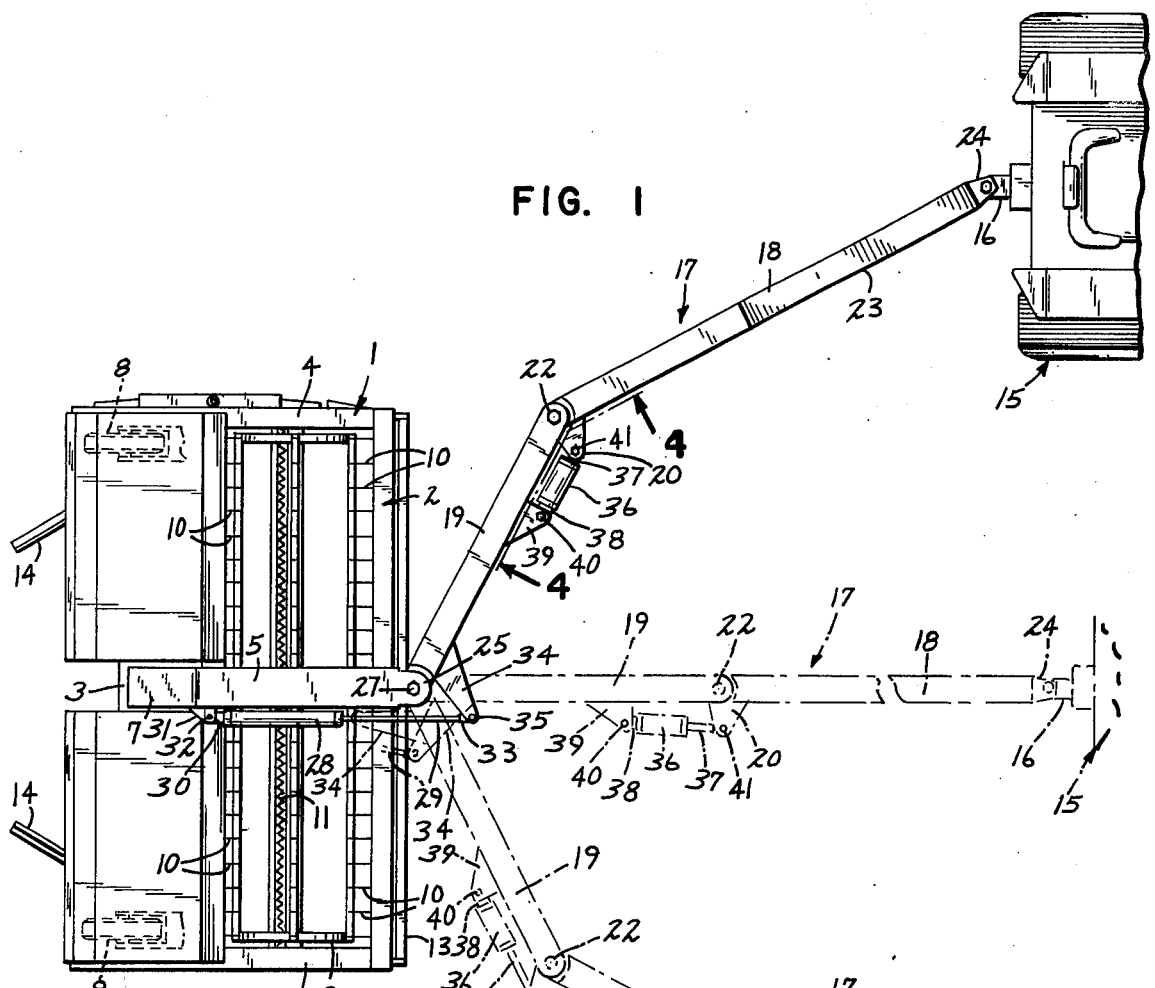
FIG. 1 is a view in top plan of the crop harvester of this invention, some parts being broken away.

In the embodiment of the invention illustrated in FIGS. 1-4, a crop harvester in the nature of a pull-type swather is shown as comprising a generally rectangular frame, indicated generally at 1, the frame including front and rear longitudinal frame members 2 and 3 respectively that extend transversely of the direction of movement of the swather, opposite side frame members 4 connecting the opposite ends of the front and rear frame members 2 and 3, and a generally central transverse frame member 5 that is connected at its opposite end portions to the front and rear frame members 2 and 3 respectively. The front frame member 2 has depending legs 6 at its opposite ends that extend downwardly therefrom and which are welded or otherwise rigidly secured to the side frame members 4. As shown particularly in FIG. 2, the front frame member 2 is disposed at a higher elevation than is the rear frame member 3, the transverse frame member 5 having a depending rear end portion 7 that rests upon and is secured to the rear frame member 3.

The frame 1 is supported at least in part by a pair of wheels 8 suitably journaled therein and carries harvesting mechanism including a reel 9 having circumferentially spaced rows of crop gathering tines 10, a conventional mower 11, and a pair of crop conditioner rolls 12, the rolls 12 being shown by dotted lines in FIG. 2. The reel 9 and conditioner rolls 12 are suitably journaled in the frame, rotation being applied thereto by suitable and well-known means, not shown. The swather further includes a push bar 13 forwardly of the reel 9 and a pair of windrow forming shields 14 rearwardly of the conditioner rolls 12. The mower 11 is mounted in the frame 1 for vertical adjustment in the usual manner. The swather mechanism, in and of itself does not comprise the instant invention. Hence, further detailed showing and description thereof is omitted in the interest of brevity.

The crop harvester is adapted to be towed over a field by any suitable means, such as a truck or tractor, a tractor being fragmentarily shown in FIG. 1 and indicated generally at 15. The tractor is shown as having a conventional drawbar extension 16 to which is pivotally secured for swinging movements on a generally vertical axis the front end of a draft tongue 17 which is shown as comprising front and rear tongue sections 18 and 19 respectively. The front and rear sections are formed at their rear and front ends respectively to provide vertically spaced hinge leaf portions 20 and 21 respectively that are disposed in interfitting relationship. The leaf portions 20 and 21 have aligned apertures therethrough for reception of a pivot shaft or bolt 22 disposed on a generally vertical axis, see particularly FIG. 4. With reference to FIG. 2, it will be seen that the rear draft tongue section 19 and the rear end portion of the front draft tongue section 18 are disposed substantially on a level with the transverse frame member 5 above the level of the front frame member 2. The front end portion of the front section 18, indicated at 23, slopes downwardly from the level of the rear end portion of the arm 18 to a level where the extreme front end 24 of the arm section 18 may rest on the drawbar 16 of the tractor.

The front end of the transverse frame member 5 projects slightly forwardly of the front frame member 2 and is formed to provide vertically spaced hinge leaf portions 25 between which extend hinge leaf portions 26 at the rear end of the rear tongue section 19. The portions 25 and 26 are provided with aligned apertures through which extends a pivot shaft or bolt 27 that is disposed on a generally vertical axis parallel to the axes of the pivot shaft 22 and pivot mounting of the draft tongue 17 to the tractor drawbar 16.

Power operated means for imparting swinging movements to the draft tongue section 19 relative to the frame 1 about the axis of the pivot shaft 27 comprises a fluid pressure cylinder 28 and a cooperating piston plunger rod 29 axially movable through one end of the cylinder 28. The other end of the cylinder 28 is provided with a hinge lug 30 that is disposed between a pair of spaced hinge brackets 31 on the transverse frame member 5 and is pivotally mounted therebetween by a pivot shaft or bolt 32. The outer end of the plunger rod 29 is formed to provide a head portion 33 that is disposed between a pair of hinge brackets 34 that project laterally outwardly from one side of the front draft tongue section 19, the head 33 being pivotally secured between the brackets 34 by a pivot shaft or bolt 35. The axes of the pivot shafts 32 and 35 are parallel to the axis of the pivot shaft 27.

For pivotally moving the draft tongue sections 18 and 19 relative to each other, a fluid pressure cylinder 36 and a cooperating piston rod 37 are employed, the piston rod 37 being axially movable through one end of the cylinder 36. A mounting lug 38 on the opposite end of the cylinder 36 is pivotally mounted between a pair of brackets 39 by means of a pivot shaft or pin 40, the brackets 39 projecting laterally outwardly of one side of the draft tongue section 19. As shown particularly in FIG. 1, the hinge leaf portions 20 on the draft tongue section 18 project laterally outwardly to pivotally receive therebetween the outer end of the piston rod 37, by means of a pivot pin or shaft 41. The pins 40 and 41 are disposed in parallel relationship to the pivot shafts 22 and 27.

As shown in FIG. 2, the rear portion 7 of the frame member 5 is preferably hollow to provide a fluid reservoir for not only the cylinders 28 and 36, but also for fluid pressure operated motors, not shown, but which may be assumed to impart rotation to the reel 9 and conditioner rolls 12. Means for transferring fluid between the reservoir and cylinders 28 and 36 includes well known fluid pumps and valves, not shown, but well known in the hydraulic arts. Causing fluid under pressure to be delivered to one end or other of the cylinders 28 and 36, the draft tongue sections 18 and 19 may be so moved with respect to each other and to the swather frame 1 that the swather may be made to travel at one side or the other of the path of travel of the tractor 15, or to trail directly behind the tractor 15, as shown by full and broken lines in FIG. 1. It will be appreciated that well known hydraulic circuitry may be employed to cause the piston rods 29 and 37 to be hydraulically locked in any desired position so that the draft tongue sections 18 and 19 may be rigidly held in any position of swinging movement relative to the frame 1.

MODIFICATION OF FIGS. 5–7

In the modified arrangement illustrated in FIGS. 5–7, a swather frame 1' may be assumed to be identical in most respects to the swather frame 1, the sole exception being in a portion of the front end of a transverse member 42. Those parts shown in FIGS. 5–7 that are identical to corresponding parts in FIGS. 1–4 are identified by the same reference numerals with prime marks added. A rear draft tongue section 43 is pivotally connected to the front end portion of the transverse frame member 42 adjacent the front frame member 2', the front end portion of the frame member 42 and rear end portion of the draft tongue section 43 having respective cooperating hinge leaf portions 44 and 45 pivotally connected together by a pivot shaft or bolt 46. With reference to FIG. 6, it will be seen that an intermediate hinge leaf portion 47 extends outwardly from the frame member 42 intermediate the hinge leaf portions 45 of the tongue section 43. The draft tongue section 43 is further provided with a pair of brackets 48 between which is received the head 33' of the plunger rod 29'. The head 33' is pivotally connected to the brackets 48 by means of a pivot pin or shaft 35'.

A front or outer draft tongue section 49 is similar to the draft tongue section 18 and is formed at its rear end to provide hinge leaf portions 50 that are pivotally connected to cooperating hinge leaf portions 51 by means of a pivot shaft or bolt 52. Suitable washers 53 are shown in FIG. 7 as being disposed between adjacent ones of the hinge leaf portions 50 and 51. It will be appreciated that washers of this type may be used in connection with the cooperating hinge leaf portions 20 and 21, 25 and 26, and 44 and 45.

As shown, the hinge leaf portions 50 have portions extending laterally outwardly from the inner end portion of the draft tongue section 49 to provide a pair of brackets 54. A control arm 55 has one end disposed between the outer ends of the brackets 54 and is pivotally mounted therebetween by means of a pivot shaft or bolt 56 disposed on an axis parallel to the axis of the pivot bolt 52. The control arm 55 is bifurcated at its rear or inner end to provide spaced arm portions 57 that straddle the bracket 48 and at their ends are pivotally mounted by means of pivot bolts 58 to bracket portions 59 that extend transversely outwardly from the hinge leaf portions 44.

As can be seen by full and broken lines in FIG. 5, as the tongue section 43 is moved angularly with respect to the frame 1', by the cylinder 28' and plunger rod 29', the control arm 55 will impart swinging movement to the front or outer tongue section 49 relative to the tongue section 43. Although not shown in FIG. 5, when the tongue section 43 extends directly forwardly from the transverse frame member 42, so as to be in line therewith, the control arm 55 will position the tongue section 49 so that it also is in alignment with the rear tongue section 43 and transverse frame member 42. In this position of the tongue sections 43 and 49, the frame 1' will be positioned directly behind a tractor.

DESCRIPTION OF MODIFICATION OF FIG. 8

Figure 8:
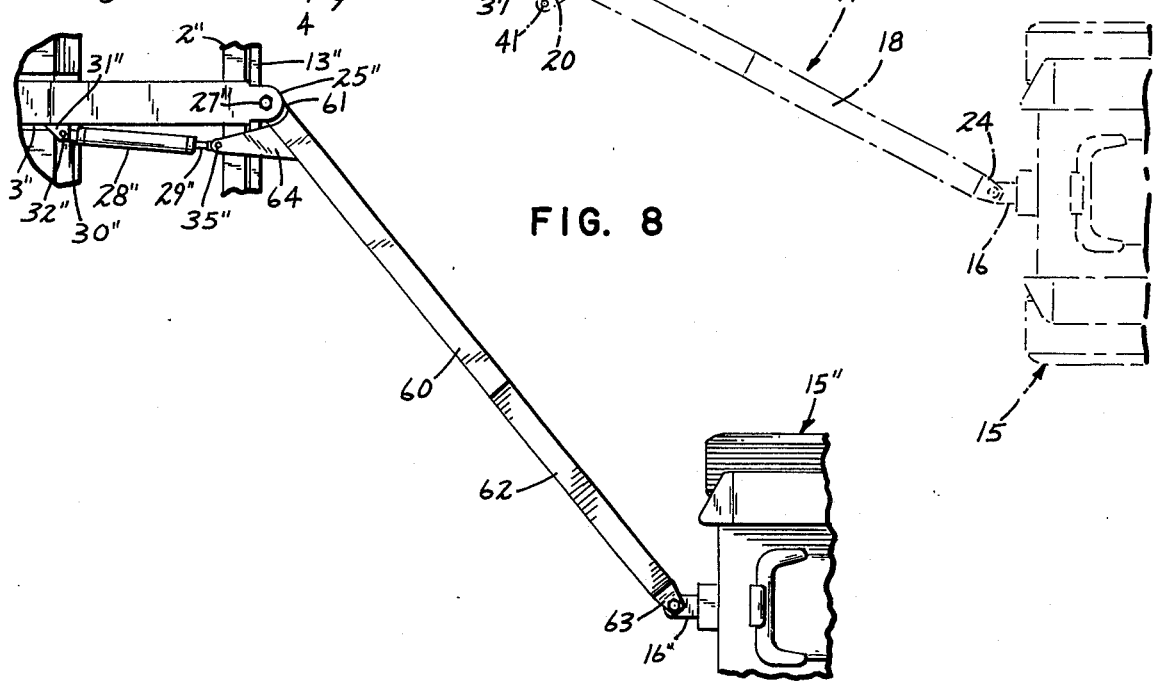
FIG. 8 is a view corresponding to a portion of FIG. 1 but showing a further modified form of the draft tongue of this invention.

In FIG. 8, a frame is shown fragmentarily, the same being identical to the frame 1 and the several parts thereof corresponding to like parts shown in FIG. 1 being identified by the same reference numerals with double prime marks added. In FIG. 8, a draft tongue 60 has an inner or rear end formed to provide hinge leaf portions 61 similar to the hinge leaf portions 26, and cooperating with the hinge leaf portions 25" and pivot shaft 27" to mount the draft tongue 60 for swinging movements on a vertical axis. The draft tongue 60 has a downwardly sloping front end portion 62 which may be assumed to be identical to the portion 23 of the draft tongue 17, and an extreme front end 63 disposed for pivotal connection to the drawbar 16" of the tractor 15". Adjacent its rear end, the draft tongue 60 is provided with a pair of brackets 64, one of which is shown, these being identical to the brackets 34. The plunger rod 29" is pivotally secured to the brackets 64 by a pivot shaft 35" disposed on a vertical axis. The draft tongue 60 may be used to advantage in connection with tractors which permit the draft tongue to be disposed at greater angles relative to the direction of travel, than others wherein such an angle is not permitted due to the placement of the drawbar on the tractor.

DESCRIPTION OF MODIFICATION OF FIGS. 9-11

In FIGS. 9-11, a swather is shown as including a frame 65 which involves front and rear frame members 66 and 67 respectively, opposite frame members 68, and a generally central transverse frame member 69. Like the frame 1, the frame 65 is supported in part by a pair of spaced wheels 70, one of which is shown, and carries harvesting mechanism including a tine-equipped reel 71, a mower 72, crop conditioner rolls 73, and a pushbar 74.

The front end of the transverse frame member 69 is pivotally connected to the rear end of a draft tongue rear section 19a which may be assumed to be substantially identical to the draft tongue section 19. A vertically extending pivot shaft 27a extends through cooperating hinge leaf portions 75 and 76 on the frame member 69 and draft tongue section 19a respectively, and through brackets 77 on the frame member 69. A fluid pressure cylinder 28a and cooperating plunger rod 29a are pivotally connected at their outer ends to respective brackets 31a and 34a on the frame member 69 and the draft tongue section 19a respectively, in the same manner as the cylinder 28 and plunger rod 29.

For the purpose of changing the angular relationship between the mower 72 and the ground, the rear end of the transverse frame member 69 is connected to the rear frame member 67 for pivotal movement on a horizontal axis extending transversely of the direction of travel of the swather. A pivot shaft 78 extends through the rear end portion of the frame 69, and through a pair of brackets 79 welded or otherwise rigidly secured to the rear frame member 67. The front frame section 66 is welded intermediate its ends to the front end portion of the frame member 69 and is braced theretoby a pair of gussets 80. At its opposite ends, the front frame member 66 is adjustably connected to the end frame members 68 by anchoring plates 81 on the end frame members 88 and brackets 82 on the opposite ends of the front frame member 66. Nut-equipped anchoring bolts 83 extend through given pairs of holes 84 and 85 in the anchoring plates 81 and brackets 82 respectively to releasably anchor the swather frame 65 with its mower 72 in a desired angular relationship with the ground, the frame 65 and mower 72 pivoting about the axis of the shaft 78.

While we have shown and described several embodiments of our tractor pulled crop harvester, it will be understood that the same is capable of further modification without the departure from the spirit and scope of the invention, as defined in the claims.

What is claimed is:

1. A tractor pulled crop harvester comprising:
   a. a wheel supported frame having a generally centrally located transverse frame member extending in the direction of travel of the frame;
   b. a harvesting mechanism mounted in said frame below said transverse frame member and rearwardly of the forward end of said transverse frame member;
   c. a draft tongue which comprises front and rear tongue sections, each having front and rear ends, characterized by means pivotally securing the front end of said rear section to the rear end of said front section on a generally vertical axis, and means for imparting pivotal movement to one of said sections relative to the other thereof and for holding said sections in different positions of swinging movement relative to each other;
   d. pivot means connecting said rear end of said rear tongue section of said draft tongue to said frame by pivotal attachment to the forward end of said transverse frame member for swinging movements of said draft tongue relative to said frame on an axis parallel to the axis of swinging movement of said front and rear tongue sections;
   e. means on the front end of said front tongue section of said draft tongue for pivotal connection on a generally vertical axis to a tractor hitch; and
   f. power operated means on said frame and draft tongue for imparting said swinging movements to said draft tongue and for holding said draft tongue in desired positions of swinging movement thereof.

2. The harvester defined in claim 1 in which said means for imparting pivotal movement to one of said sections comprises a fluid pressure operated motor having a pair of relatively movable parts each of which is connected to a different one of said tongue sections.

3. The harvester defined in claim 1 in which said means for imparting pivotal movement to one of said sections relative to the other thereof is disposed to impart said pivotal movement to said front section relative to said rear section responsive to swinging movement imparted to said draft tongue by said power operated means.

4. The harvester defined in claim 3 in which said means for imparting pivotal movements to one of said sections comprises a control arm having one end pivotally connected to said frame on a generally vertical axis and an opposite end pivotally connected to said front draft tongue section on an axis parallel to the pivot axis at said one end of the control arm.

5. The harvester defined in claim 1 in which said frame includes front and rear longitudinal frame members extending transversely of the direction of travel of the frame, and a pair of end frame members, characterized by mounting means pivotally connecting said transverse frame member to said rear frame member for swinging movements on a horizontal axis extending transversely of the direction of travel of said frame, and adjustment means connecting the opposite ends of said front frame member to said end frame members for varying the angular relationship of the frame with the ground about the axis of pivotal movement of said mounting means.

* * * * *